US012621059B2

(12) United States Patent (10) Patent No.: US 12,621,059 B2
Oh (45) Date of Patent: May 5, 2026

(54) DECODING METHOD USING POLARIZATION TIME BLOCK CODING AND DECODING DEVICE FOR PERFORMING THE METHOD

(71) Applicant: ELECTRONICS AND TELECOMMUNICATIONS RESEARCH INSTITUTE, Daejeon (KR)

(72) Inventor: Jung-yeol Oh, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 348 days.

(21) Appl. No.: 18/417,816

(22) Filed: Jan. 19, 2024

(65) Prior Publication Data

US 2025/0080232 A1 Mar. 6, 2025

(30) Foreign Application Priority Data

Aug. 28, 2023 (KR) ........................ 10-2023-0112964

(51) Int. Cl.
*H04B 10/61* (2013.01)

(52) U.S. Cl.
CPC ..... *H04B 10/6162* (2013.01); *H04B 10/6165* (2013.01)

(58) Field of Classification Search
CPC ........................................ H04B 10/6162–6166
See application file for complete search history.

(56) References Cited

U.S. PATENT DOCUMENTS 9,720,177 B2 8/2017 An et al.
11,005,570 B2 5/2021 Lee et al.
(Continued)

FOREIGN PATENT DOCUMENTS

CN 112615678 A * 4/2021 ............. H04B 10/61
KR 10-2012-0065726 A 6/2012
KR 10-1931957 B1 3/2019

OTHER PUBLICATIONS

Erkiling et al., "PON transceiver technologies for >=50 Gbits/s per λ: Alamouti coding and heterodyne detection", Journal of Optical Communications and Networking, vol. 12, No. 2, Feb. 2020 (Year: 2020).*

(Continued)

*Primary Examiner* — Shi K Li

(74) *Attorney, Agent, or Firm* — Rabin & Berdo, P.C.

(57) ABSTRACT

Provided is a decoding method using polarization time block coding (PTBC) and a decoding device for performing the decoding method. The decoding method includes branching received symbols consecutively received according to a symbol period into two paths, delaying a first received symbol corresponding to a first path between the two paths by the symbol period in which the received symbols are received, performing a complex conjugate operation on a second received symbol corresponding to a second path between the two paths, compensating for channel distortion of the first received symbol delayed by the symbol period and the second received symbol on which the complex conjugate operation is performed, through an equalizer in the decoding device, and restoring a transmission symbol by performing phase restoration on the first received symbol and the second received symbol for which the channel distortion is compensated for, through a phase compensator in the decoding device.

13 Claims, 11 Drawing Sheets

400

(56) References Cited

U.S. PATENT DOCUMENTS

2019/0334627 A1    10/2019  Kaneda et al.
2026/0012307 A1*    1/2026  Xing ..................... H04L 5/0048

OTHER PUBLICATIONS

Md. Saifuddin Faruk et al., "DSP algorithms for recovering single-carrier Alamouti coded signals for PON applications", Optics Express, vol. 24, No. 21, pp. 24083-24091, Oct. 17, 2016.

* cited by examiner

300

400

DECODING METHOD USING POLARIZATION TIME BLOCK CODING AND DECODING DEVICE FOR PERFORMING THE METHOD

CROSS-REFERENCE TO RELATED APPLICATIONS

This application claims the benefit of Korean Patent Application No. 10-2023-0112964, filed on Aug. 28, 2023, in the Korean Intellectual Property Office, the entire disclosure of which is incorporated herein by reference for all purposes.

BACKGROUND

1. Field of the Invention

One or more embodiments relate to a decoding method using polarization time block coding (PTBC) technology in a coherent optical communication system and a device for performing the same.

2. Description of the Related Art

A coherent optical communication system provides higher transmission capacity and spectral efficiency compared to an intensity modulation/direct detection (IM/DD) optical communication system. However, such a coherent optical communication system requires an optical receiver with a dual polarization structure having a polarization diversity function because the state of polarization of an optical signal transmitted from an optical fiber changes randomly.

Since the optical receiver with a dual polarization structure has high optical component complexity, a coherent optical communication method using polarization time block coding (PTBC) using an Alamouti code is proposed as a method of implementing a cost-effective coherent optical receiver.

The coherent optical communication method using PTBC provides a method of Alamouti-encoding so that two adjacent symbols in the time domain are orthogonal to each other for X polarization and Y polarization when generating a transmission signal from a coherent optical transmitter and restoring an original signal using a decoding device to which PTBC technology is applied in a coherent optical receiver.

Such a coherent optical communication method using PTBC may realize a coherent optical receiver with a single polarization reception structure rather than an existing dual polarization reception structure, there is an advantage of reducing optical components by 50% compared to an existing method.

However, the decoding device using PTBC in a coherent optical receiver with a single polarization reception structure according to the related art has a problem in that the performance degradation of an equalizer may occur due to the bandwidth limitation of optical components. More specifically, in the coherent optical receiver with a single polarization reception structure according to the related art, a received symbol may be divided into an odd-numbered term and an even-numbered term through a serial-parallel converter, so signal components of a symbol scattered in an adjacent symbol are separated into different equalizers and there may be a problem that an equalizer does not sufficiently compensate for the signal.

SUMMARY

Embodiments provide a structure of a decoding device that may improve the performance degradation of an equalizer caused by a bandwidth limitation effect of optical components in a coherent optical receiver.

However, the technical aspects are not limited to the aforementioned aspects, and other technical aspects may be present.

According to an aspect, there is provided a decoding method, performed by a decoding device, using polarization time block coding (PTBC), the decoding method including branching received symbols consecutively received according to a symbol period into two paths, delaying a first received symbol corresponding to a first path between the two paths by the symbol period in which the received symbols are received, performing a complex conjugate operation on a second received symbol corresponding to a second path between the two paths, compensating for channel distortion of the first received symbol delayed by the symbol period and the second received symbol on which the complex conjugate operation is performed, through an equalizer in the decoding device, and restoring a transmission symbol by performing phase restoration on the first received symbol and the second received symbol for which the channel distortion is compensated for, through a phase compensator in the decoding device.

The first received symbol and the second received symbol may include identical symbols by copying the received received symbols.

The compensating for the channel distortion may include compensating for the channel distortion of the first received symbol and the second received symbol using the equalizer based on a channel filter coefficient set by a channel coefficient for X polarization and a channel coefficient for Y polarization.

The decoding method may further include performing down-sampling on the first received symbol and the second received symbol for which the channel distortion is compensated for. The restoring of the transmission symbol may include restoring the transmission symbol by performing the phase restoration on the first received symbol and second received symbol on which the down-sampling is performed.

According to another aspect, there is provided a decoding device including one or more processors and a memory configured to load or store a program executed by the one or more processors, wherein the program includes instructions configured to branch received symbols consecutively received according to a symbol period into two paths, delay a first received symbol corresponding to a first path between the two paths by the symbol period in which the received symbols are received, perform a complex conjugate operation on a second received symbol corresponding to a second path between the two paths, compensate for channel distortion of the first received symbol delayed by the symbol period and the second received symbol on which the complex conjugate operation is performed, through an equalizer in the decoding device, and restore a transmission symbol by performing phase restoration on the first received symbol and the second received symbol for which the channel distortion is compensated for, through a phase compensator in the decoding device.

The first received symbol and the second received symbol may include identical symbols by copying the received received symbols.

The one or more processors may be configured to compensate for the channel distortion of the first received symbol and the second received symbol using the equalizer based on a channel filter coefficient set by a channel coefficient for X polarization and a channel coefficient for Y polarization.

The one or more processors may be configured to perform down-sampling on the first received symbol and the second received symbol for which the channel distortion is compensated for and restore the transmission symbol by performing the phase restoration on the first received symbol and the second received symbol on which the down-sampling is performed.

According to another aspect, there is provided an optical receiver including a decoding device including a local oscillator (LO), an optical mixer configured to mix a polarization component of a local oscillation signal output from the LO and a polarization component of an optical signal transmitted and received to and from an optical transmitter, an optical detector configured to convert optical signals output from the optical mixer into electrical analog signals and transmit the electrical analog signals to an optical amplifier, an analog-to-digital converter (ADC) configured to convert an electrical analog signal output from the optical amplifier into a digital signal, and a decoding device configured to restore an original signal transmitted from the optical transmitter from digital signals output from the ADC, wherein the decoding device is configured to branch received symbols consecutively received according to a symbol period into two paths, delay a first received symbol corresponding to a first path between the two paths by the symbol period in which the received symbols are received, perform a complex conjugate operation on a second received symbol corresponding to a second path between the two paths, compensate for channel distortion of the first received symbol delayed by the symbol period and the second received symbol on which the complex conjugate operation is performed, through an equalizer in the decoding device, and restore a transmission symbol by performing phase restoration on the first received symbol and the second received symbol for which the channel distortion is compensated for, through a phase compensator in the decoding device.

The first received symbol and the second received symbol may include identical symbols by copying the received received symbols.

The decoding device may be configured to compensate for the channel distortion of the first received symbol and the second received symbol using the equalizer based on a channel filter coefficient set by a channel coefficient for X polarization and a channel coefficient for Y polarization.

The decoding device may be configured to perform down-sampling on the first received symbol and the second received symbol for which the channel distortion is compensated for and restore the transmission symbol by performing the phase restoration on the first received symbol and the second received symbol on which the down-sampling is performed.

Additional aspects of embodiments will be set forth in part in the description which follows and, in part, will be apparent from the description, or may be learned by practice of the disclosure.

According to embodiments, a structure of a decoding device may be provided that may improve performance degradation of an equalizer caused by a bandwidth limitation effect of optical components in a coherent optical receiver.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
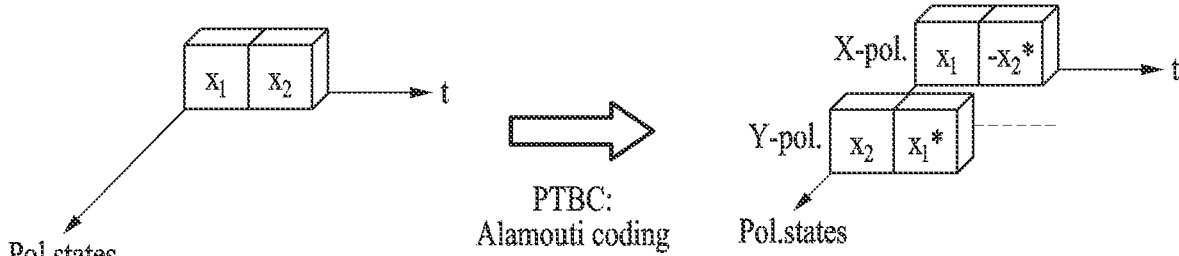
FIG. 1 is a diagram illustrating a structure of polarization time block coding (PTBC) using an Alamouti code according to an embodiment.

The following detailed structural or functional description is provided as an example only and various alterations and modifications may be made to examples. Here, examples are not construed as limited to the disclosure and should be understood to include all changes, equivalents, and replacements within the idea and the technical scope of the disclosure.

Terms, such as "first", "second", and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/including" and/or "includes/including" when used herein, specify the presence of stated features, integers, operations, operations, elements, and/or components, but do not preclude the presence or addition of one or more other features, integers, operations, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and any repeated description related thereto will be omitted.

FIG. 1 is a diagram illustrating a structure of polarization time block coding (PTBC) using an Alamouti code according to an embodiment.

A coherent optical communication system of the present disclosure may use PTBC using an Alamouti code to realize a single polarization reception structure rather than a dual polarization reception structure.

More specifically, a coherent optical transmitter of the coherent optical communication system may transmit a symbol $x_1$ to X polarization and transmit a symbol $x_2$ to Y polarization during a section of a first symbol period when a transmission signal to be transmitted includes the symbol $x_1$ and the symbol $x_2$. Then, the coherent optical transmitter may transmit a symbol $-x^*_2$ to the X polarization and transmit a symbol $x^*_1$ to the Y polarization during a section of a second symbol period. Here, ( )* may refer to a complex conjugate operation.

Figure 2:
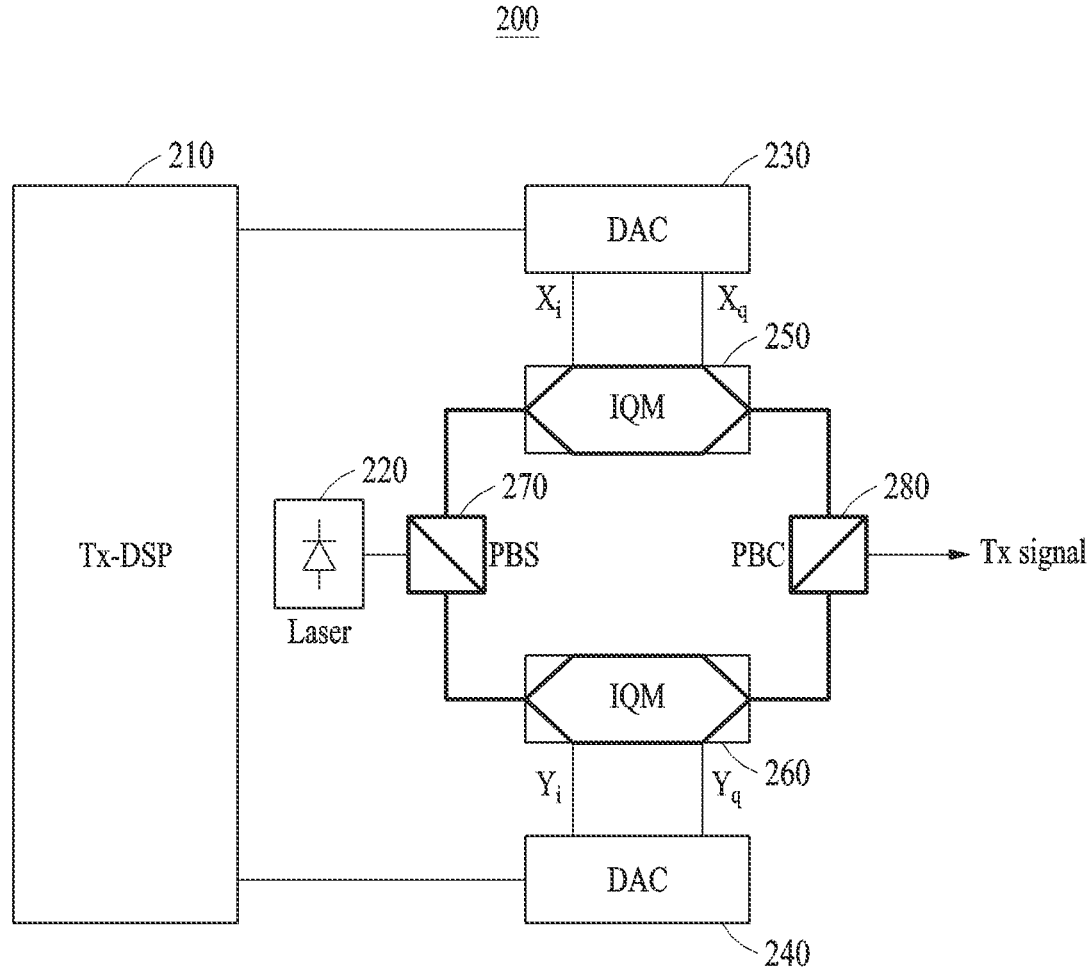
FIG. 2 is a diagram illustrating a structure of a coherent optical transmitter according to an embodiment.

Accordingly, two adjacent symbol pairs $[x_1, x_2]$ and $[-x^*_2, x^*_1]$ may have characteristics that are orthogonal to each other in the complex domain and the symbol $x_1$ and the symbol $x_2$ encoded through PTBC using the orthogonal characteristics may be transmitted to an optical fiber through the coherent optical transmitter, as shown in FIG. 2 below.

FIG. 2 is a diagram illustrating a structure of a coherent optical transmitter according to an embodiment.

Referring to FIG. 2, a coherent optical transmitter 200 of the present disclosure may include a digital signal processor for transmission (Tx-DSP) 210, a laser 220, and digital-to-analog converters (DACs) 230 and 240, in-phase quadrature modulators (IQMs) 250 and 260, a polarization beam splitter (PBS) 270, and a polarization beam combiner (PBC) 280.

First, the Tx-DSP 210 may generate symbol pairs (e.g., the $[x_1, x_2]$ and $[-x^*_2, x^*_1]$) to be transmitted through each of the X polarization and the Y polarization by performing PTBC using an Alamouti code. In FIG. 2, $X_i$ represents the in-phase signal of the X polarization, $X_q$ represents the quadrature signal of the X polarization, $Y_i$ represents the in-phase signal of the Y polarization, and $Y_q$ represents the quadrature signal of the Y polarization.

The laser 220 may output a laser beam to transmit a symbol sequence to a coherent optical receiver, and the PBS 270 may divide the laser beam output from the laser 220 into the parallel polarization (the X polarization) and the perpendicular polarization (the Y polarization).

The IQMs 250 and 260 may modulate the symbol pair $[x_1, x_2]$ converted into an analog signal through the DACs 230 and 240 to a beam of the X polarization and a beam of the Y polarization divided through the PBS 270 in a symbol period $t_1$. The modulated beam of the X polarization and the modulated beam of the Y polarization may be combined by the PBC 280 and transmitted to the coherent optical receiver through an optical fiber.

Then, the IQMs 250 and 260 may modulate the symbol pair $[-x^*_2, x^*_1]$ converted into an analog signal through the DACs 230 and 240 to a beam of the X polarization and a beam of the Y polarization divided through the PBS 270 in a symbol period $t_2$. The modulated beam of the X polarization and the modulated beam of the Y polarization may be combined by the PBC 280 and transmitted to a coherent optical receiver through an optical fiber.

Figure 3:
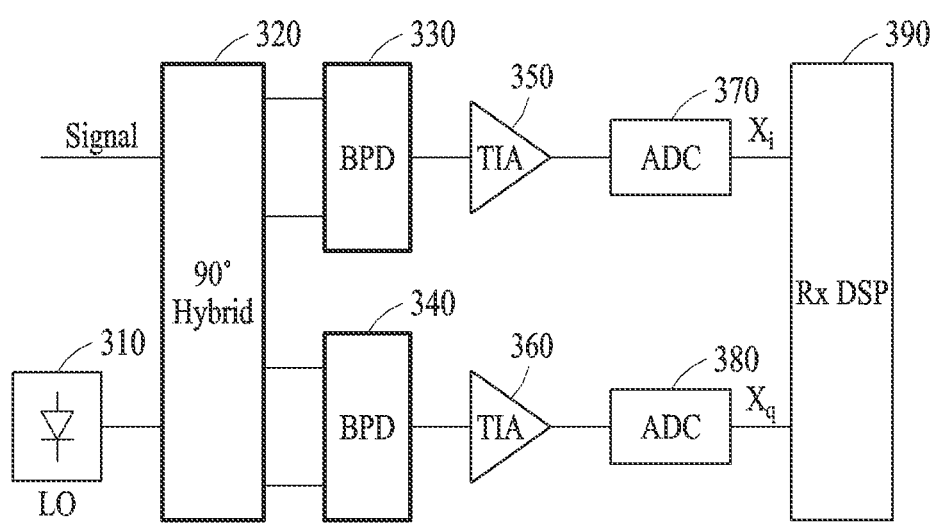
FIG. 3 is a diagram illustrating a structure of a coherent optical receiver according to an embodiment.

FIG. 3 is a diagram illustrating a structure of a coherent optical receiver according to an embodiment.

Referring to FIG. 3, a coherent optical receiver 300 of the present disclosure may include a local oscillator (LO) 310, an optical mixer 320, photo detectors 330 and 340, photo-electric amplifiers 350 and 360, analog-to-digital converters (ADCs) 370 and 380, and a digital signal processor for receiving (Rx-DSP) 390.

First, a received optical signal may be mixed by the optical mixer 320 with a local oscillation signal output from the LO 310. For example, the optical mixer 320 may synthesize signals and use a 90 degrees (°) optical hybrid coupler that outputs a signal with a phase difference of 90°.

The photo detectors 330 and 340 may convert optical signals output from the optical mixer 320 into electrical analog signals and output the electrical analog signals to the photo-electric amplifiers 350 and 360. For example, the photo detectors 330 and 340 may be balanced photo detectors (BPDs) and the photo-electric amplifiers 350 and 360 may be trans-impedance amplifiers (TIAs). However, the type of photo detectors and photo-electric amplifiers is only an example and is not limited thereto.

The ADCs 370 and 380 may convert an electrical analog signal output from the photo-electric amplifiers 350 and 360 into a digital signal.

The Rx-DSP 390 may restore an original signal transmitted from the coherent optical transmitter 200 from digital signals output from the ADCs 370 and 380. That is, the Rx-DSP 390 may be a decoding device, and a structure and operating method of the decoding device are described in detail below with reference to FIG. 4.

Figure 4:
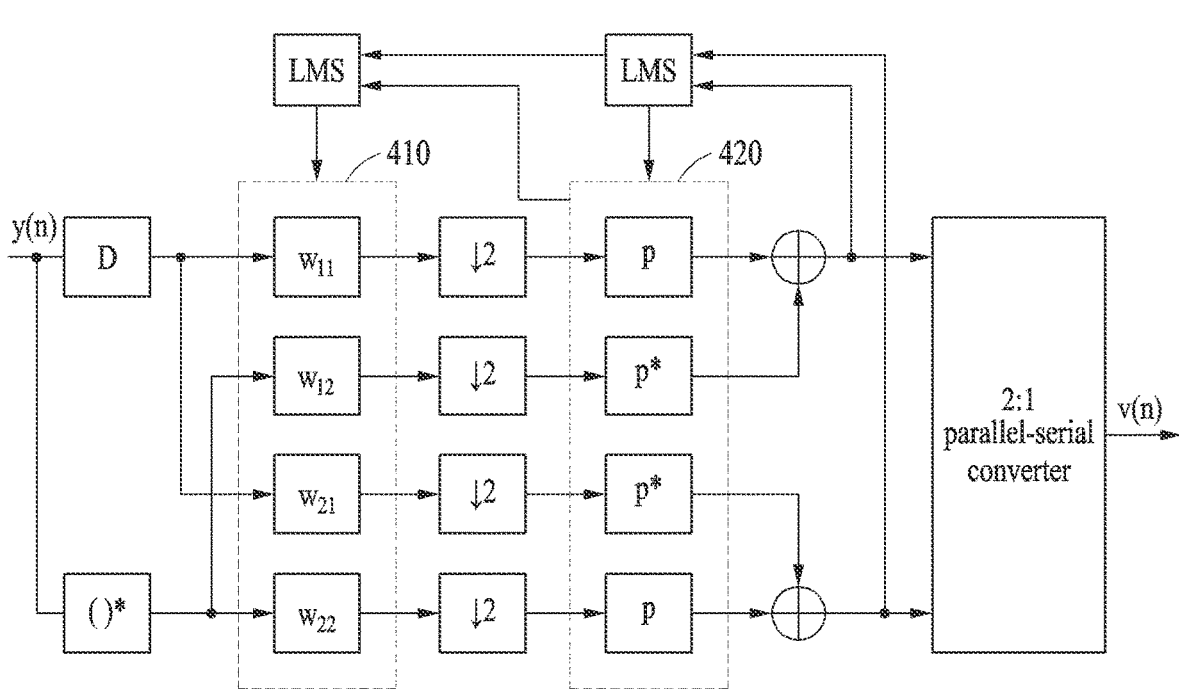
FIG. 4 is a diagram illustrating a structure of a decoding device according to an embodiment.

FIG. 4 is a diagram illustrating a structure of a decoding device according to an embodiment.

A decoding device 400 of the present disclosure may restore an original signal by performing PTBC using an Alamouti code. More specifically, the decoding device 400 may not perform serial-to-parallel conversion on a received signal y(n) formed of received symbols and may copy and branch the received signal y(n) into two branches.

The decoding device 400 may delay (D) a first received symbol branched into a first path between the two paths by a symbol period Ts and may perform a complex conjugate operation ( )* on a second received symbol branched into a second path between the two paths.

Then, the decoding device 400 may compensate for channel distortion of the first received symbol delayed by the symbol period Ts and the second received symbol on which the complex conjugate operation ( )* is performed, through an equalizer 410 and may restore a transmission symbol of an original signal by performing phase restoration on the first received symbol and the second received symbol for which the channel distortion is compensated for, through a phase compensator 420.

More specifically, the received signal y(n) received by the decoding device 400 may be defined as Equations 1 and 2 below, when a channel coefficient for the X polarization is represented as $h_1$ and a channel coefficient for the Y polarization is represented as $h_2$.

Equation 1 below may represent a received signal $y_1$ received at a symbol period $t_1$ and Equation 2 below may represent y* in which the complex conjugate operation ( )* is performed on a received signal $y_2$ received at a symbol period $t_2$.

$$y_1 = [\,h_1 \quad h_2\,]\begin{bmatrix} x_1 \\ x_2 \end{bmatrix} + n_1 \qquad \text{[Equation 1]}$$

$$y_1^* = [\,h_2^* \quad -h_1^*\,]\begin{bmatrix} x_1 \\ x_2 \end{bmatrix} + n_2^* \qquad \text{[Equation 2]}$$

Here, $n_1$ and $n_2$ denote noise generated in each polarization mode channel.

The decoding device 400 may combine the received signal $y_1$ with the received signal $y^*$ and convert the combined received signals $y_1$ and $y^*$ into a 2×2 multiple-input and multiple-output (MIMO) system as shown in Equation 3 below.

$$\begin{bmatrix} y_1 \\ y_2^* \end{bmatrix} = \begin{bmatrix} h_1 & h_2 \\ h_2^* & -h_1^* \end{bmatrix}\begin{bmatrix} x_1 \\ x_2 \end{bmatrix} + \begin{bmatrix} n_1 \\ n_2^* \end{bmatrix} \qquad \text{[Equation 3]}$$

Accordingly, a channel coefficient H for PTBC may be expressed as Equation 4 below.

$$H = \begin{bmatrix} h_1 & h_2 \\ h_2^* & -h_1^* \end{bmatrix} \qquad \text{[Equation 4]}$$

Here, the decoding device 400 may set a channel filter coefficient using the channel coefficient H to restore the transmission symbol of the original signal from the received signal y(n) to which PTBC is applied, as shown in Equation 5 below.

$$w_1 = \frac{1}{\|h\|}\begin{bmatrix} h_1 \\ h_2^* \end{bmatrix}, \; w_2 = \frac{1}{\|h\|}\begin{bmatrix} h_2 \\ -h_1^* \end{bmatrix} \qquad \text{[Equation 5]}$$

Here, $\|h\|$ may be $\sqrt{|h_1|^2 + |h_2|^2}$ $\left(i.e., \; \|h\| = \sqrt{|h_1|^2 + |h_2|^2}\right)$.

The decoding device 400 may restore the transmission symbol of the original signal by multiplying the received signal y(n) by an inverse function of the channel coefficient H, as shown in Equation 6 below.

$$w_1^H Y = \begin{bmatrix} \frac{h_1^*}{\|h\|} & \frac{h_2}{\|h\|} \end{bmatrix}\begin{bmatrix} h_1 & h_2 \\ h_2^* & -h_1^* \end{bmatrix}\begin{bmatrix} x_1 \\ x_2 \end{bmatrix} + \qquad \text{[Equation 6]}$$

$$w_1^H n = [\,\|h\| \quad 0\,]\begin{bmatrix} x_1 \\ x_2 \end{bmatrix} + \widetilde{n_1} = \|h\| x_1 + \widetilde{n_1}$$

$$w_2^H Y = \begin{bmatrix} \frac{h_2^*}{\|h\|} & \frac{-h_1}{\|h\|} \end{bmatrix}\begin{bmatrix} h_1 & h_2 \\ h_2^* & -h_1^* \end{bmatrix}\begin{bmatrix} x_1 \\ x_2 \end{bmatrix} + $$

$$w_1^H n = [\,0 \quad \|h\|\,]\begin{bmatrix} x_1 \\ x_2 \end{bmatrix} + \widetilde{n_2} = \|h\| x_2 + \widetilde{n_2}$$

Here, an $(\;)^H$ operator is a Hermitian operator, which takes a transpose and complex number in the matrix, and an n denotes a noise vector.

When considering the influence of phase noise θ by a transmission laser, the matrix of a received signal may be expressed as Equation 7 below.

$$\begin{bmatrix} y_1 \\ y_2^* \end{bmatrix} = \begin{bmatrix} h_1 e^{j\theta} & h_2 e^{j\theta} \\ h_2^* e^{-j\theta} & -h_1^* e^{-j\theta} \end{bmatrix}\begin{bmatrix} x_1 \\ x_2 \end{bmatrix} + \begin{bmatrix} n_1 \\ n_2^* \end{bmatrix} \qquad \text{[Equation 7]}$$

Accordingly, a channel filter coefficient of the equalizer 410 to restore the transmission symbol of the original signal considering the influence of the phase noise may be expressed as Equation 8 below.

$$\begin{bmatrix} h_1 e^{j\theta} & h_2 e^{j\theta} \\ h_2^* e^{-j\theta} & -h_1^* e^{-j\theta} \end{bmatrix}^H = \begin{bmatrix} h_1^* e^{-j\theta} & h_2 e^{j\theta} \\ h_2^* e^{-j\theta} & -h_1 e^{j\theta} \end{bmatrix} = \begin{bmatrix} w_{11}p & w_{12}p^* \\ w_{21}p & w_{22}p^* \end{bmatrix} \qquad \text{[Equation 8]}$$

The decoding device 400 may compensate for channel distortion through the equalizer 410 of the type of 2×2 MIMO that performs PTBC decoding based on the channel filter coefficient described above and may restore the transmission symbol of the original signal by performing phase restoration through the phase compensator 420.

Here, the decoding device 400 may perform double down-sampling between the equalizer 410 and the phase compensator 420 to match the symbol rate. As described above, the transmission signal formed of the symbol $x_1$ and the symbol $x_2$ may be transmitted to the coherent optical receiver from the coherent optical transmitter during two symbol periods through polarization time block encoding.

In the decoding structure according to the related art, a transmission symbol of an original signal may be restored using a received symbol at an odd-numbered symbol period and a received symbol at an even-numbered symbol period through a serial-to-parallel conversion structure. That is, in the decoding structure according to the related art, the transmission symbol of the original signal may be restored through two symbol periods 2Ts.

However, since the decoding device 400 of the present disclosure does not have a serial-to-parallel conversion structure, the processing rate of the equalizer 410 may correspond to the symbol period Ts. Accordingly, the present disclosure may convert an output of the equalizer 410 into the two symbol periods 2Ts like the decoding structure in which a serial-to-parallel conversion structure exists according to the related art and may restore two transmission symbols during the two symbol periods 2Ts by providing down-sampling between the equalizer 410 and the phase compensator 420.

Furthermore, the equalizer 410 forming the decoding device 400 of the present disclosure is an adaptive equalizer, and a channel coefficient of the equalizer 410 may be optimized by continuously updating a tap weight of a finite impulse response (FIR) filter. Here, the channel coefficient of the equalizer 410 may be optimized in terms of a least mean square (LMS) and the phase compensator 420 may also be optimized in terms of an LMS like the equalizer 410.

Finally, the two transmission symbols restored during the two symbol periods 2Ts may be simultaneously output in parallel by down-sampling. The decoding device 400 may output v(n) having the symbol period Ts by converting the two transmission symbols output in parallel at the symbol period 2Ts into a series through a 2:1 parallel-serial converter.

Figure 5:
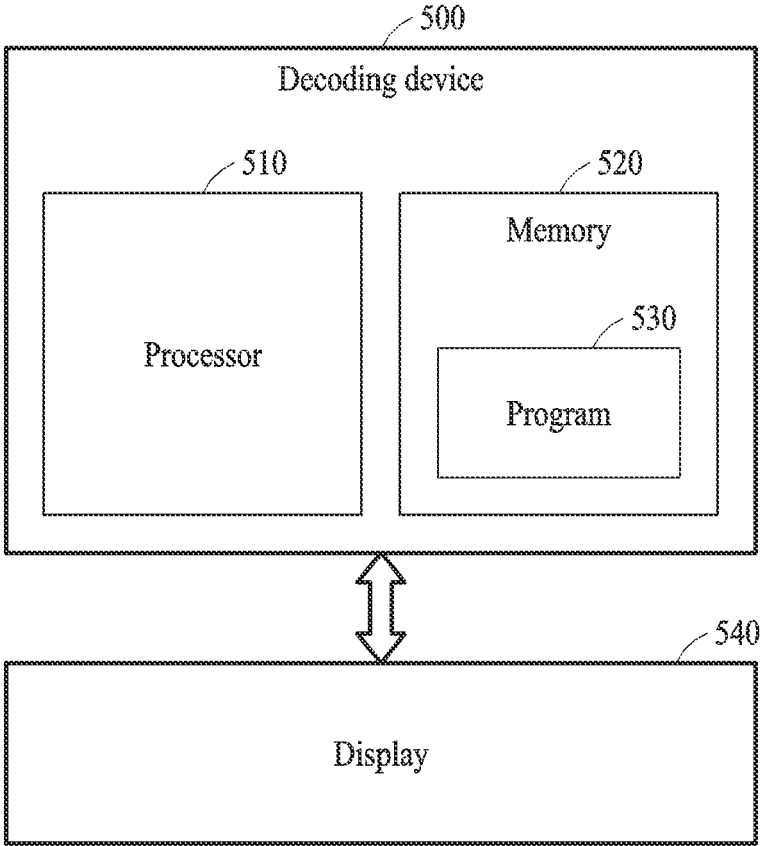
FIG. 5 is a diagram illustrating a configuration of a decoding device according to an embodiment.

FIG. 5 is a diagram illustrating a configuration of a decoding device according to an embodiment.

As shown in FIG. 5, a decoding device 500 may include one or more processors 510 and a memory 520 for loading or storing a program 530 performed by the one or more processors 510. The components in the decoding device 500 of FIG. 5 are only an example, and one of ordinary skill in the art may understand that other general-purpose components may be further included, besides the components illustrated in FIG. 5.

The one or more processors 510 may control the overall operation of each component of the decoding device 500. The one or more processors 510 may include a central processing unit (CPU), a microprocessor unit (MPU), a microcontroller unit (MCU), a graphics processing unit (GPU), a neural processing unit (NPU), and a digital signal processor (DSP), or at least one of any well-known types of processors in the technical fields of the present disclosure. In addition, the one or more processors 510 may perform an operation on at least one application or program to perform the methods/operations according to various embodiments of the present disclosure. The decoding device 500 may include the one or more processors 510.

The memory 520 may store one or a combination of two or more of various pieces of data, commands, and information that are used by the components (e.g., the one or more processors 510) in the decoding device 500. The memory 520 may include a volatile memory or a non-volatile memory.

The program 530 may include one or more actions in which the methods/operations according to various embodiments of the present disclosure are implemented and may be stored in the memory 520 as software. Here, the one or more actions may correspond to a command implemented in the program 530. For example, the program 530 may include instructions configured to branch received symbols consecutively received according to a symbol period into two paths, delay a first received symbol corresponding to a first path between the two paths by a symbol period, perform a complex conjugate operation on a second received symbol corresponding to a second path between the two paths, compensate for channel distortion of the first received symbol delayed by the symbol period and the second received symbol on which the complex conjugate operation is performed, through an equalizer, and restore a transmission symbol by performing phase restoration on the first received symbol and the second received symbol for which the channel distortion is compensated for, through a phase compensator.

When the program 530 is loaded in the memory 520, the one or more processors 510 may execute a plurality of operations to implement the program 530 and perform the methods/operations according to various embodiments of the present disclosure.

An execution screen of the program 530 may be displayed on a display 540. Although the display 540 is illustrated as a separate device connected to the decoding device 500 in FIG. 5, the display 540 may be included in the components of the decoding device 500 when the decoding device 500 is a smartphone, a tablet, or other terminals that are portable by a user. A screen displayed on the display 540 may be a state before information is input to the program 530 or may be the execution result of the program 530.

FIGS. 6 to 11 are diagrams illustrating a simulation comparison result of the structure according to the related art and the proposed structure through an embodiment of a 100 gigabits per seconds (Gbps) 16-quadrature amplitude modulation (QAM) coherent PTBC optical communication system according to an embodiment.

Figure 6:
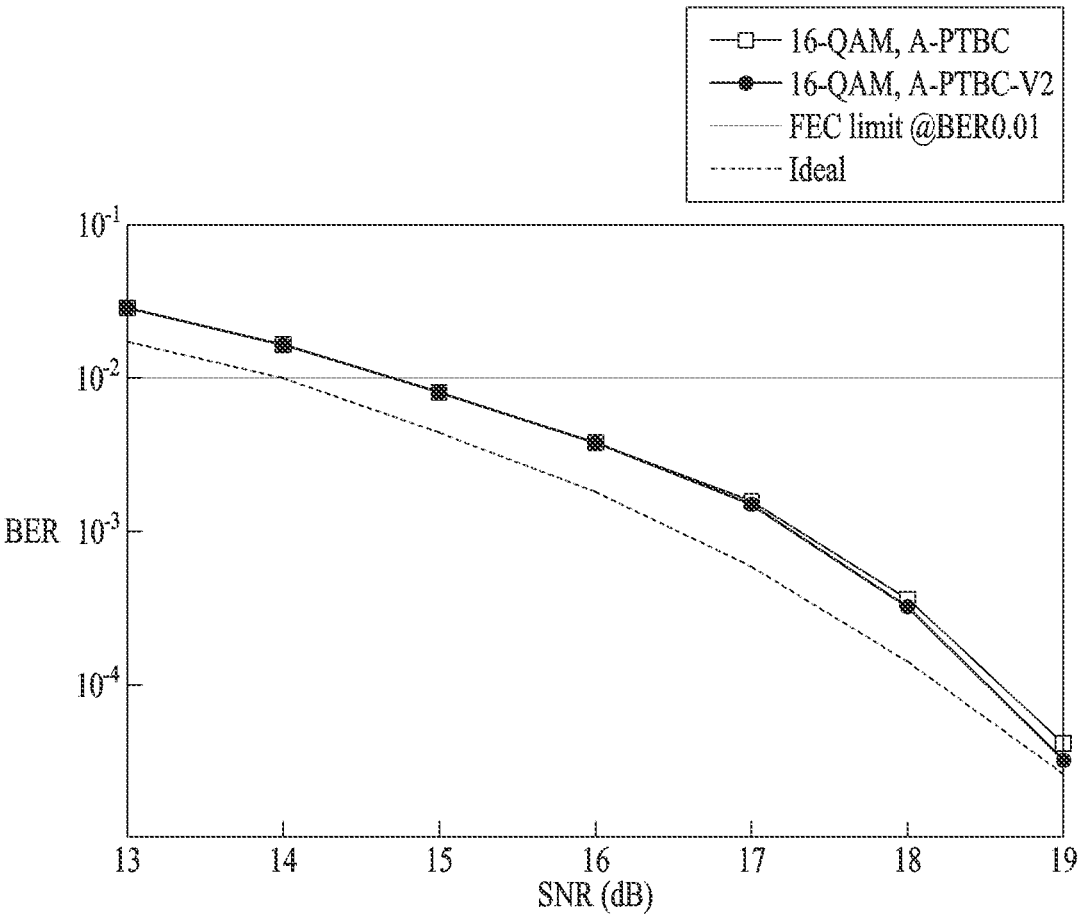
FIGS. 6 to 11 are diagrams illustrating a simulation comparison result of the structure according to the related art and the proposed structure through an embodiment of a 100 gigabits per seconds (Gbps) 16-quadrature amplitude modulation (QAM) coherent PTBC optical communication system according to an embodiment.

FIG. 6 is an example of comparing the bit error rate (BER) performance of the PTBC structure (A-PTBC) according to the related art with the PTBC structure (A-PTBC-V2) proposed herein when there is no bandwidth limitation effect of optical components under additive white Gaussian noise (AWGN). It may be seen that the two structures have the same performance when there is no bandwidth limitation effect by optical components.

Figure 7:
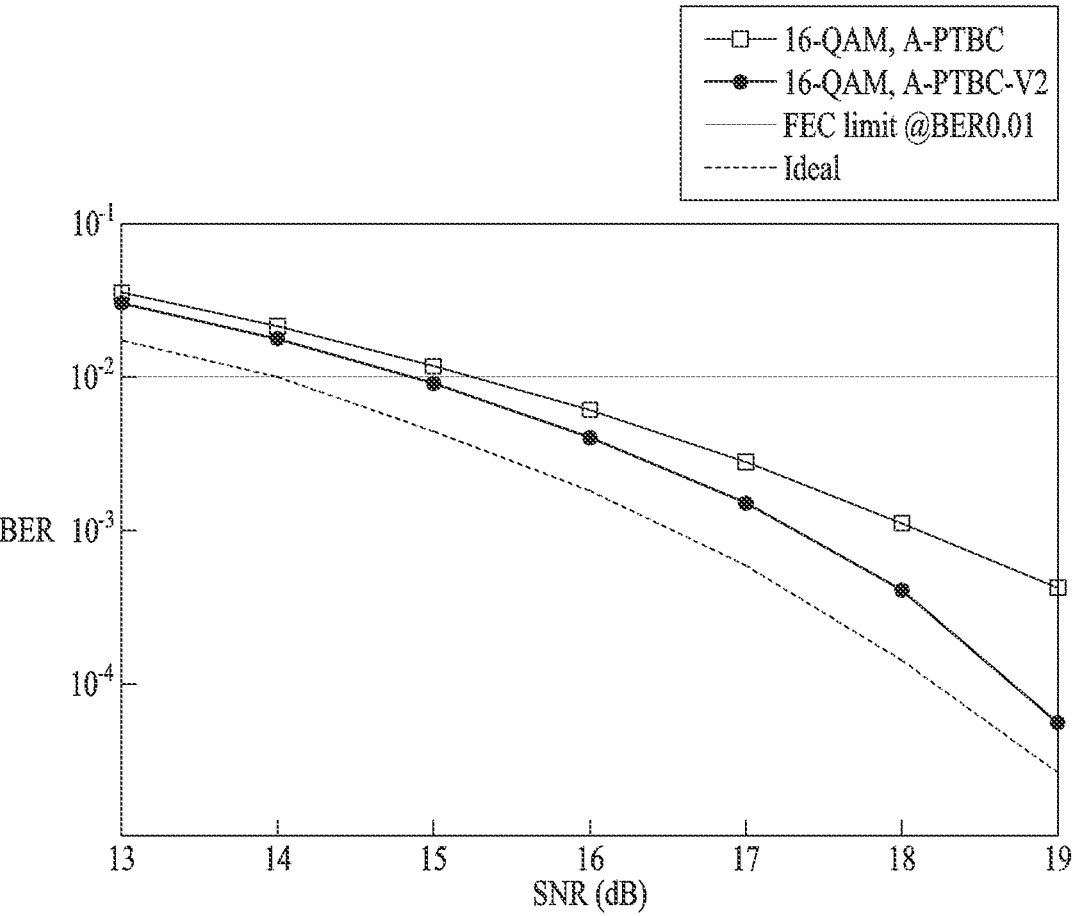

FIG. 7 is an example of comparing the performance of the PTBC structure (A-PTBC) according to the related art with the PTBC structure (A-PTBC-V2) proposed herein when there is a bandwidth limitation effect by a DAC or an ADC under AWGN.

Here, the given bandwidth limitation effect may correspond to 0.9 times the symbol rate. It may be seen that the PTBC structure (A-PTBC) according to the related art shows performance degradation of about 0.5 decibels (dB) at the standard forward error correction (FEC) limit BER $10^{-2}$, while the PTBC structure (A-PTBC-V2) proposed herein shows performance degradation of about 0.1 dB.

Figure 8:
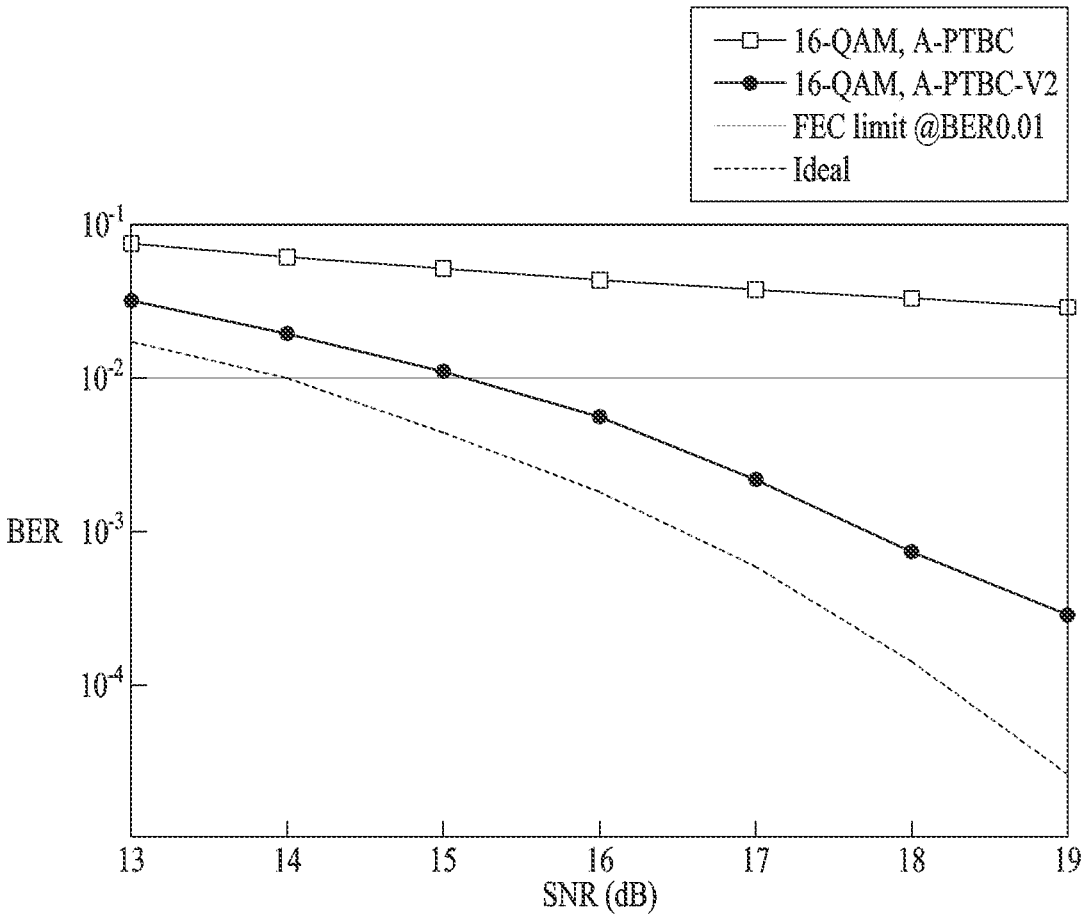

FIG. 8 is an example of comparing the performance of the PTBC structure (A-PTBC) according to the related art with the PTBC structure (A-PTBC-V2) proposed herein when there is a bandwidth limitation effect by an IQM or a BPD under AWGN.

Here, the given bandwidth limitation effect may also correspond to 0.9 times the symbol rate. It may be seen that the PTBC structure (A-PTBC) according to the related art shows significant performance degradation, while the PTBC structure (A-PTBC-V2) proposed herein shows performance degradation of about 0.4 dB at the FEC limit BER $10^{-2}$.

Figure 9:
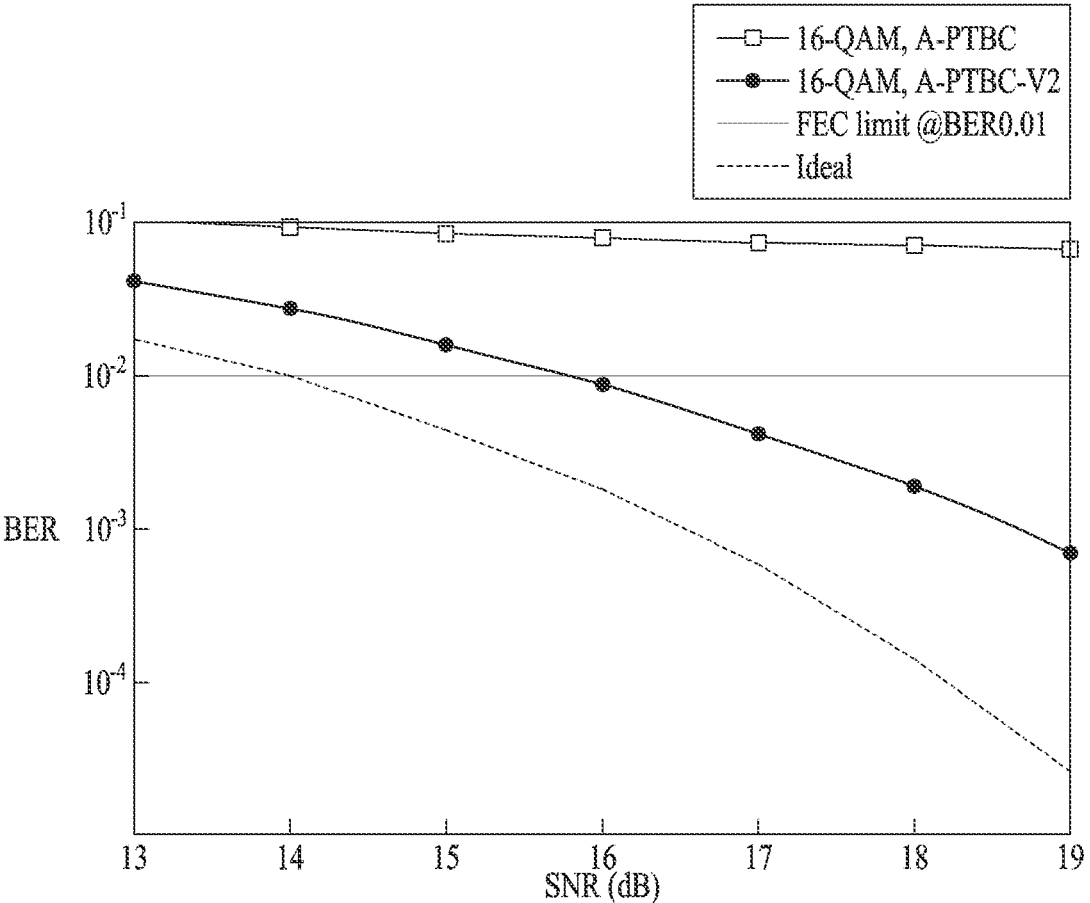

FIG. 9 is an example of comparing the performance of the PTBC structure (A-PTBC) according to the related art with the PTBC structure (A-PTBC-V2) proposed herein when there is an overlapping bandwidth limitation effect of a DAC or ADC and IQM or BPD under AWGN.

Here, the given bandwidth limitation effect may also correspond 0.9 times the symbol rate. It may be seen that the PTBC structure (A-PTBC) according to the related art shows significant performance degradation, while the PTBC structure (A-PTBC-V2) proposed herein shows performance degradation of about 0.95 dB at the FEC limit BER $10^{-2}$.

Furthermore, a matched filter may be used as a method of alleviating the performance degradation caused by the bandwidth limitation and improving the signal-to-noise ratio (SNR). The performance degradation caused by the bandwidth limitation of optical components may be improved when using a square root raised cosine (SRRC) filter as a matched filter in a coherent optical transmitter and a coherent optical receiver.

Figure 10:
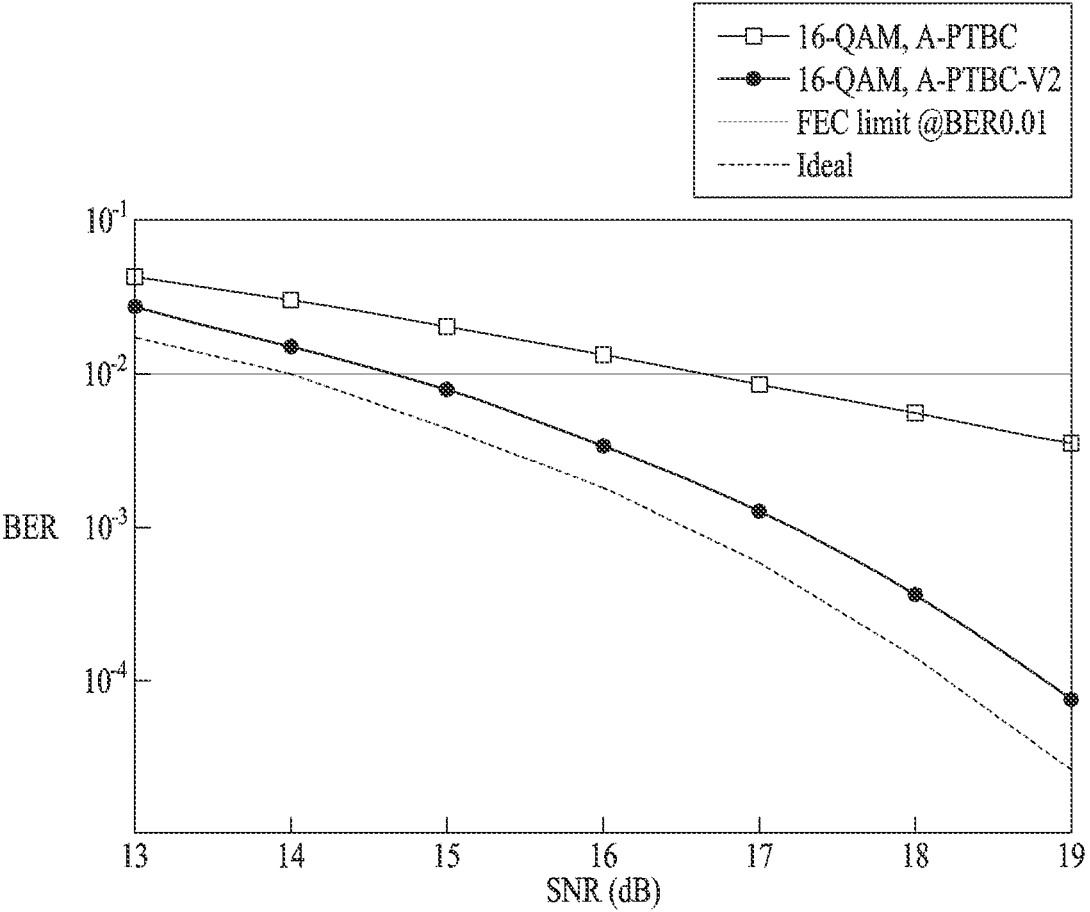

FIG. 10 is an example of comparing the performance of the PTBC structure (A-PTBC) according to the related art with the PTBC structure (A-PTBC-V2) proposed herein on which an SRRC matched filter is used when there is an overlapping bandwidth limitation effect of a DAC or ADC and IQM or BPD under AWGN.

When compared with FIG. 9, it may be seen that the structure proposed herein eliminates all effects caused by the bandwidth limitation using an SRRC matched filter. However, it may be seen that the PTBC structure (A-PTBC) according to the related art shows performance degradation of about 1.7 dB at the FEC limit BER 102 even though a matched filter is used.

Figure 11:
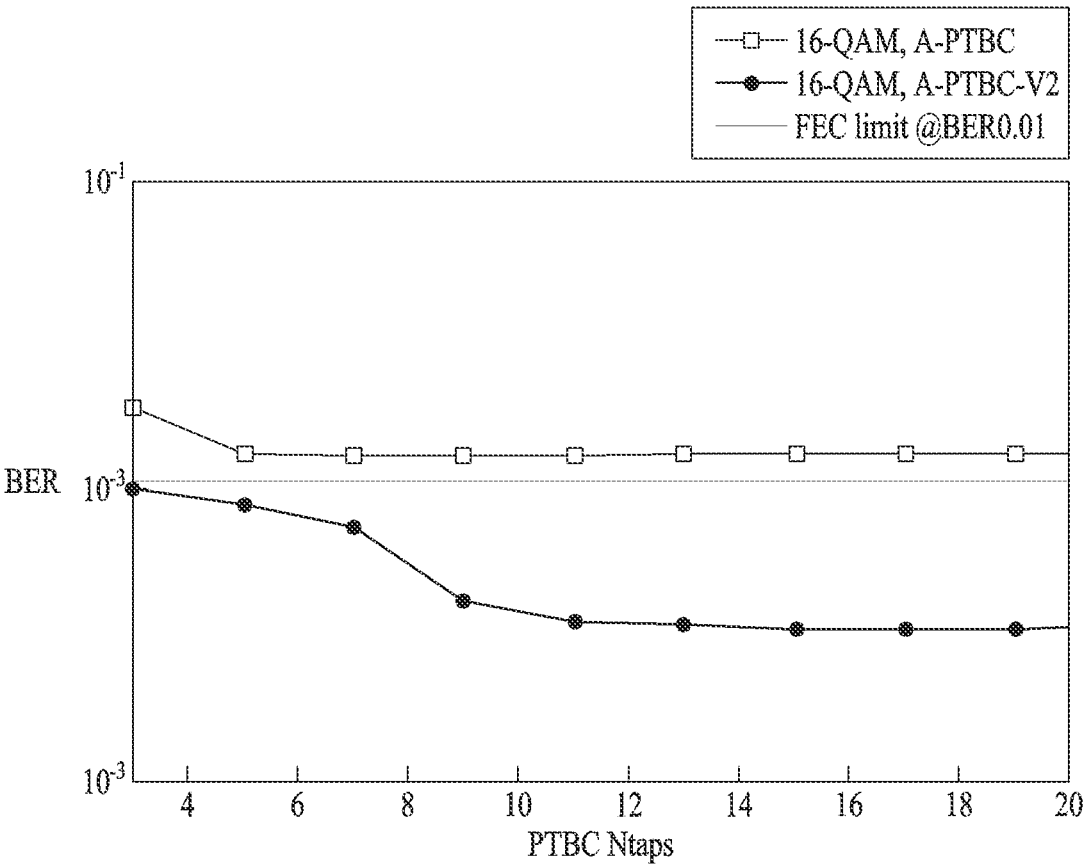

FIG. 11 is an example of comparing the performance of the PTBC structure (A-PTBC) according to the related art with the PTBC structure (A-PTBC-V2) proposed herein when fixing an SNR and changing the number of filter taps of an equalizer when there is an overlapping bandwidth limitation effect of DAC/ADC/IQM/BPD and an SRRC matched filter is used. It may be seen that the performance of the PTBC structure (A-PTBC) according to the related art is not improved even when the number of filter taps of an equalizer is increased by greater than or equal to 5, but the structure proposed herein is expected to improve the performance of an equalizer when the number of filter tabs is increased to 15.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The embodiments described herein may be implemented using a hardware component, a software component, and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the description of a processing device is singular; however, one of ordinary skill in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or collectively instruct or configure the processing device to operate as desired. Software and data may be stored in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored in a non-transitory computer-readable recording medium.

The methods according to the embodiments may be recorded in non-transitory computer-readable media including program instructions to implement various operations of embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Embodiments of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

The above-described hardware devices may be configured to act as one or more software modules in order to perform the operations of the above-described embodiments, or vice versa.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, other implementations, other embodiments, and equivalents to the claims are also within the scope of the following claims.

What is claimed is:

1. A decoding method, performed by a decoding device, using polarization time block coding (PTBC), the decoding method comprising:

branching received symbols consecutively received according to a symbol period into two paths;

delaying a first received symbol corresponding to a first path between the two paths by the symbol period in which the received symbols are received;

performing a complex conjugate operation on a second received symbol corresponding to a second path between the two paths;

compensating for channel distortion of the first received symbol delayed by the symbol period and the second received symbol on which the complex conjugate operation is performed, through an equalizer in the decoding device; and restoring a transmission symbol by performing phase restoration on the first received symbol and the second received symbol for which the channel distortion is compensated for, through a phase compensator in the decoding device.

2. The decoding method of claim 1, wherein the first received symbol and the second received symbol comprise identical symbols by copying the received received symbols.

3. The decoding method of claim 1, wherein the compensating for the channel distortion comprises compensating for the channel distortion of the first received symbol and the second received symbol using the equalizer based on a channel filter coefficient set by a channel coefficient for X polarization and a channel coefficient for Y polarization.

4. The decoding method of claim 1, further comprising:

performing down-sampling on the first received symbol and the second received symbol for which the channel distortion is compensated for, wherein the restoring of the transmission symbol comprises restoring the transmission symbol by performing the phase restoration on the first received symbol and second received symbol on which the down-sampling is performed.

5. A non-transitory computer-readable storage medium storing instructions that, when executed by a processor, cause the processor to perform the method of claim 1.

6. A decoding device comprising:

one or more processors; and a memory configured to load or store a program executed by the one or more processors, wherein the program comprises instructions configured to branch received symbols consecutively received according to a symbol period into two paths, delay a first received symbol corresponding to a first path between the two paths by the symbol period in which the received symbols are received, perform a complex conjugate operation on a second received symbol corresponding to a second path between the two paths, compensate for channel distortion of the first received symbol delayed by the symbol period and the second received symbol on which the complex conjugate operation is performed, through an equalizer in the decoding device, and restore a transmission symbol by performing phase restoration on the first received symbol and the second received symbol for which the channel distortion is compensated for, through a phase compensator in the decoding device.

7. The decoding device of claim 6, wherein the first received symbol and the second received symbol comprise identical symbols by copying the received received symbols.

8. The decoding device of claim 6, wherein the one or more processors are configured to compensate for the channel distortion of the first received symbol and the second received symbol using the equalizer based on a channel filter coefficient set by a channel coefficient for X polarization and a channel coefficient for Y polarization.

9. The decoding device of claim 6, wherein the one or more processors are configured to perform down-sampling on the first received symbol and the second received symbol for which the channel distortion is compensated for and restore the transmission symbol by performing the phase restoration on the first received symbol and the second received symbol on which the down-sampling is performed.

10. An optical receiver comprising a decoding device, the optical receiver comprising:

a local oscillator (LO);

an optical mixer configured to mix a polarization component of a local oscillation signal output from the LO and a polarization component of an optical signal transmitted and received to and from an optical transmitter;

an optical detector configured to convert optical signals output from the optical mixer into electrical analog signals and transmit the electrical analog signals to an optical amplifier;

an analog-to-digital converter (ADC) configured to convert an electrical analog signal output from the optical amplifier into a digital signal; and a decoding device configured to restore an original signal transmitted from the optical transmitter from digital signals output from the ADC, wherein the decoding device is configured to branch received symbols consecutively received according to a symbol period into two paths, delay a first received symbol corresponding to a first path between the two paths by the symbol period in which the received symbols are received, perform a complex conjugate operation on a second received symbol corresponding to a second path between the two paths, compensate for channel distortion of the first received symbol delayed by the symbol period and the second received symbol on which the complex conjugate operation is performed, through an equalizer in the decoding device, and restore a transmission symbol by performing phase restoration on the first received symbol and the second received symbol for which the channel distortion is compensated for, through a phase compensator in the decoding device.

11. The optical receiver of claim 10, wherein the first received symbol and the second received symbol comprise identical symbols by copying the received received symbols.

12. The optical receiver of claim 10, wherein the decoding device is configured to compensate for the channel distortion of the first received symbol and the second received symbol using the equalizer based on a channel filter coefficient set by a channel coefficient for X polarization and a channel coefficient for Y polarization.

13. The optical receiver of claim 10, wherein the decoding device is configured to perform down-sampling on the first received symbol and the second received symbol for which the channel distortion is compensated for and restore the transmission symbol by performing the phase restoration on the first received symbol and the second received symbol on which the down-sampling is performed.

* * * * *